Dec. 31, 1963 W. R. KEEN ETAL 3,115,678
APPARATUS FOR MOLDING PLASTIC CARPETS
Filed Oct. 7, 1960 5 Sheets-Sheet 1

INVENTORS.
William Rollin Keen,
Herman J. Kerner & Jackson Bauer,
BY Paul & Paul
ATTORNEYS.

Dec. 31, 1963   W. R. KEEN ETAL   3,115,678
APPARATUS FOR MOLDING PLASTIC CARPETS
Filed Oct. 7, 1960   5 Sheets-Sheet 2
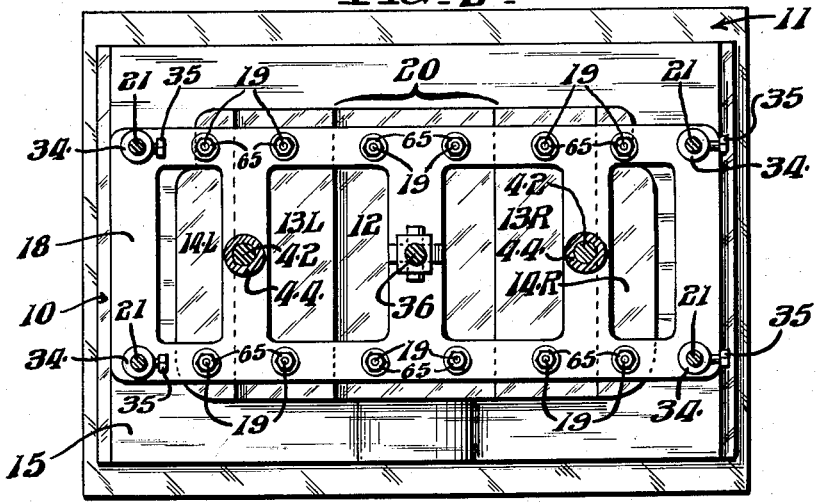
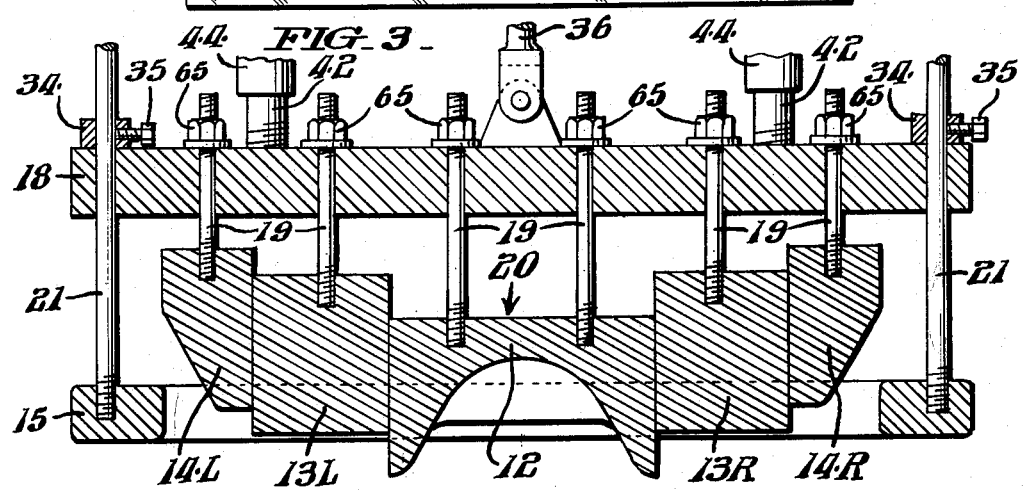
INVENTORS.
William Rollin Keen,
Herman J. Kerner & Jackson Bauer,
BY Paul & Paul
ATTORNEYS.

Dec. 31, 1963 W. R. KEEN ETAL 3,115,678
APPARATUS FOR MOLDING PLASTIC CARPETS
Filed Oct. 7, 1960 5 Sheets-Sheet 3
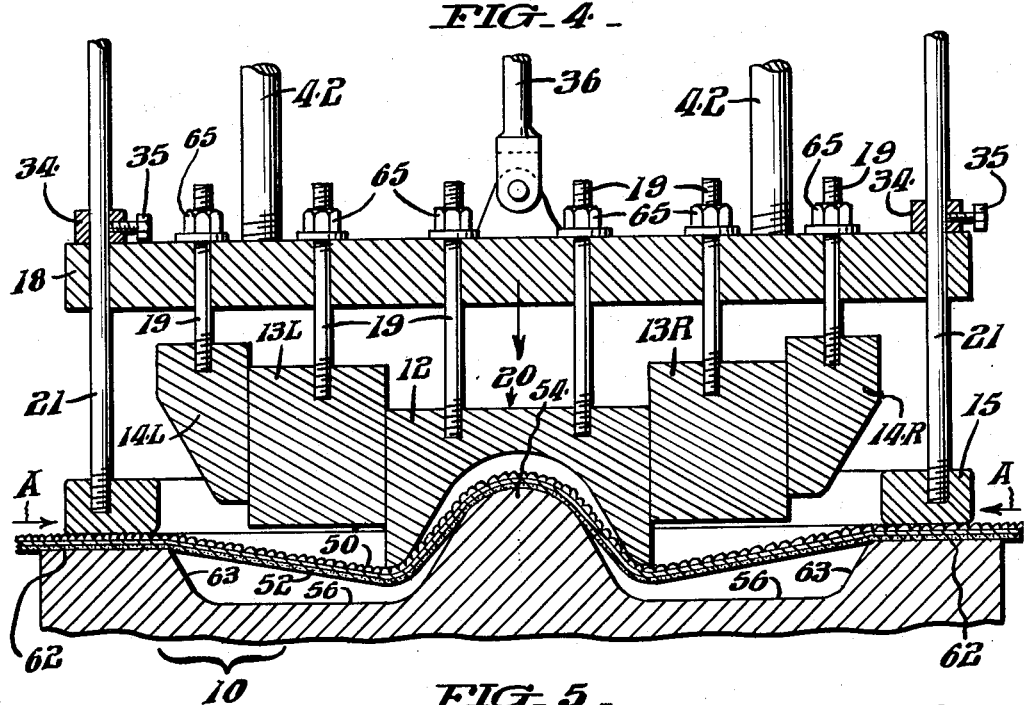
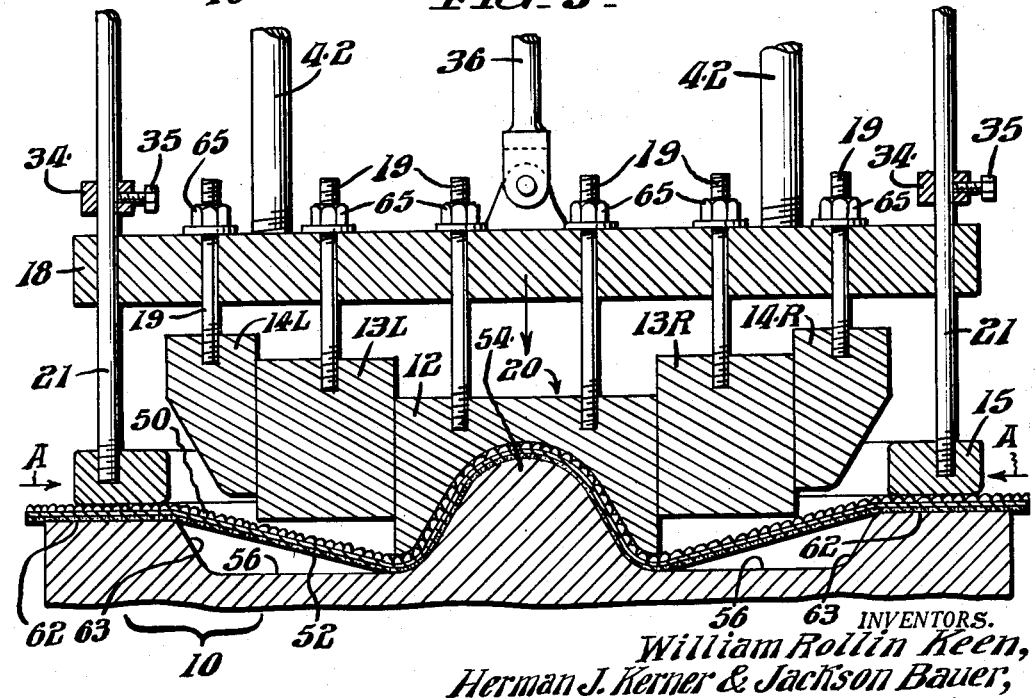
INVENTORS.
William Rollin Keen,
Herman J. Kerner & Jackson Bauer,
BY Paul & Paul
ATTORNEYS.

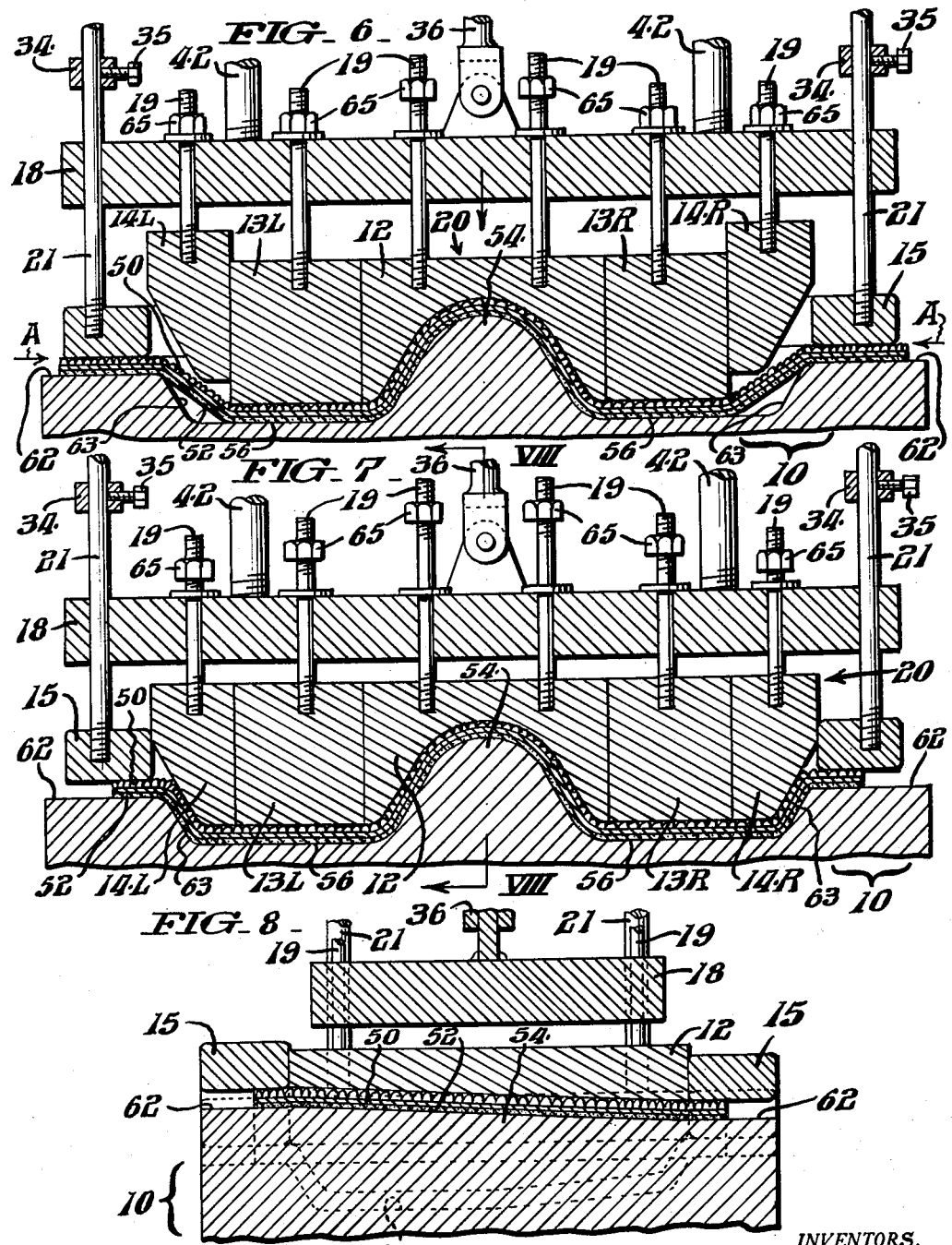

Dec. 31, 1963 W. R. KEEN ETAL 3,115,678
APPARATUS FOR MOLDING PLASTIC CARPETS
Filed Oct. 7, 1960 5 Sheets-Sheet 5
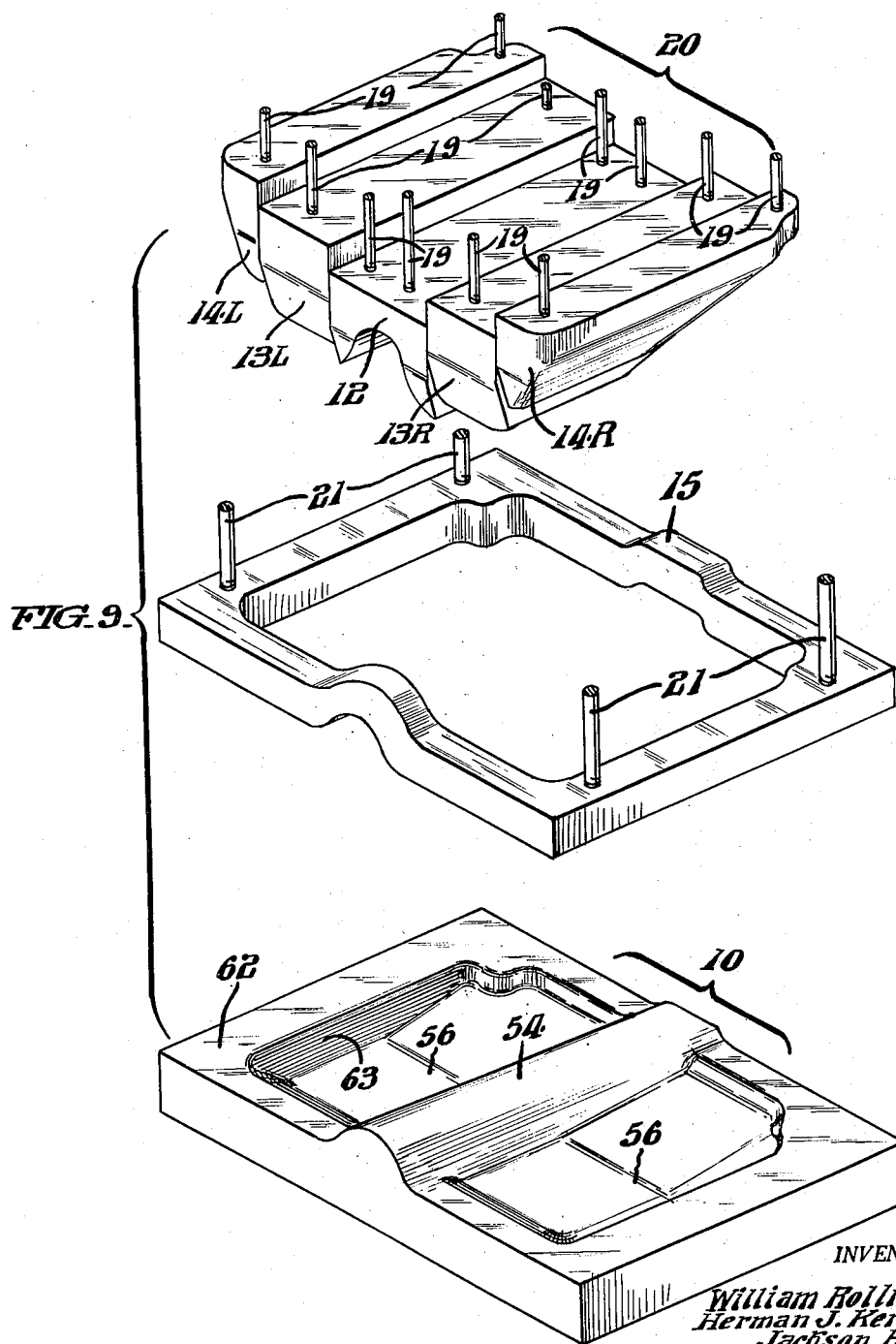
INVENTORS.
William Rollin Keen,
Herman J. Kerner &
Jackson Bauer,
BY Paul & Paul
ATTORNEYS.

United States Patent Office 3,115,678
Patented Dec. 31, 1963

3,115,678
APPARATUS FOR MOLDING PLASTIC CARPETS
William Rollin Keen, Bowling Green, Pa., and Herman J. Kerner and Jackson Bauer, Albemarle, N.C., assignors to Collins & Aikman Corporation, New York, N.Y., a corporation of Delaware
Filed Oct. 7, 1960, Ser. No. 61,241
4 Claims. (Cl. 18—19)

This invention relates to a means for molding carpet to a desired form. The invention is useful, for example, in molding carpet for use on the rear or front floors of automobiles which are characterized by having a raised or humped center portion forming a tunnel for a drive shaft or forming a cavity for some other under-floor mechanism.

The present invention provides a means for pre-forming such carpet. The method includes the steps of placing carpet having a hot thermoplastic backing across a lower mold (without draping the carpet into the wells of the mold) and then lowering thereupon a multi-section male mold. The arrangement is such that mating engagement is made progressively and successively with the lower mold by different sections of the male mold. In one embodiment, a five-section male mold is used, with mating engagement being made first by the center section, next by intermediate sections on either side of the center section, and lastly by outer sections. In another embodiment, the male mold is only a three-section mold, a center section, which makes mating engagement first, and two outer sections.

During the progressive procedure referred to above, the carpet is drawn inwardly toward the center of the lower or female mold. At a selected point early in the procedure of lowering of the male mold progressively into the female mold, the outer or peripheral portions of the carpet are contacted by a pressure ring which is supported by the male mold supporting means and lowered with the male mold. The downward movement of the pressure ring is, however, limited by stop means which stop the pressure ring when it reaches a point above the lower mold such that the space between the pressure ring and the lower mold is equal approximately to one-half the over-all thickness of the carpet being molded. This narrow space functions to so confine the carpet that wrinkles cannot form, while still allowing sufficient freedom to slip horizontally.

The carpet may be molded with or without a jute pad underlay. Where a jute pad underlay is used, the jute pad is preferably, but not necessarily, impregnated. The jute pad is preferably die cut and placed in the lower mold where it conforms approximately to the mold contour and covers those portions of the lower mold corresponding to those portions of the car floor desired to be covered. The heated carpet with a hot polyethylene or other thermoplastic on its underside is then placed across the lower mold, not therein. The male mold is then lowered and the carpet and jute pad are molded together simultaneously. No additional adhesive is required to bond the jute pad to the carpet.

Our invention will be clear from a consideration of the following detailed description of a preferred embodiment selected for illustration in the drawing in which:

FIG. 2 is a view along the line II—II of FIG. 1 looking in the direction of the arrows;

FIGS. 3, 4, 5, 6 and 7 are front elevational views, in section, showing progressively the manner in which the multi-section male mold is lowered into the female mold compressing the carpet therebetween;

FIG. 8 is a view, in section, along the line VIII—VIII of FIG. 7 looking in the direction of the arrows; and FIG. 9 is an exploded view of the preferred form of mold.

Figure 1:
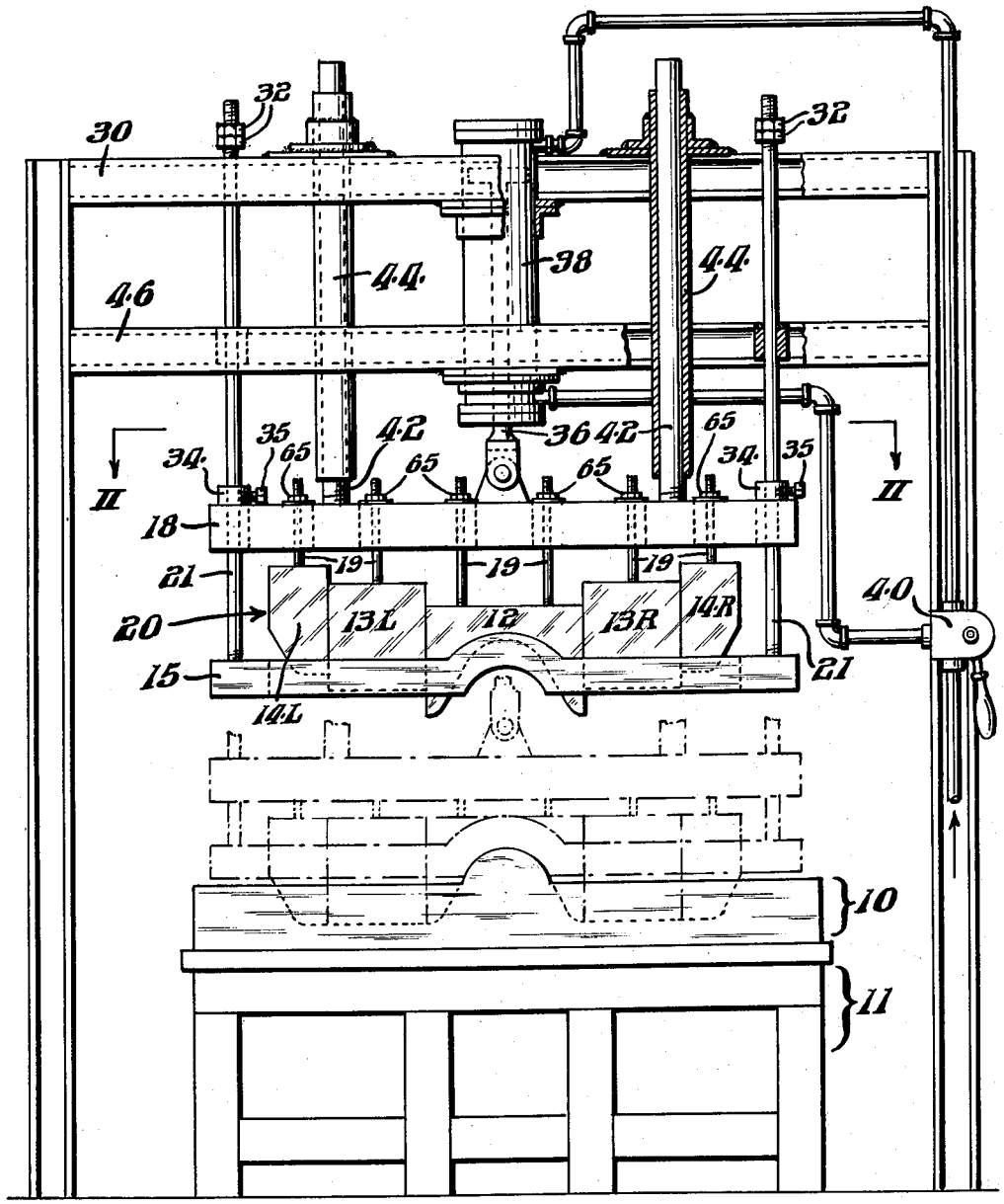
FIG. 1 is a front elevational view of a molding apparatus according to the present invention.

In describing the preferred embodiment of the invention illustrated in the drawing, specific terminology has been resorted to for the sake of clarity. However, it is not the intention to be limited to the specific terms so selected, and it is to be understood that each specific term includes all technical equivalents which operate in a similar manner to accomplish a similar purpose.

Referring now to FIG. 1, there is shown a female mold 10 supported by a table 11. The form of the female mold 10 is seen more clearly in FIG. 9. The mold may be made of metal, fiber glass, or any other suitable material.

Suspended above female mold 10 is a multi-section male mold 20 which, in the particular embodiment illustrated, as seen clearly in FIG. 9, comprises a center section 12, left and right intermediate sections 13L and 13R, and left and right end sections 14L and 14R. Surrounding the multi-section male mold 20 is a rectangular pressure ring 15 adapted to be moved into a position just above the outer ledges 62 of the female mold 10 and to be supported thereabove at a spacing equal to approximately one-half the overall thickness of the carpet.

Referring again to FIG. 1, and also to FIG. 2, the multi-section male mold 20 is suspended from a generally rectangular supporting carriage 18, as by means of twelve bolts 19. Supporting carriage 18 is, in turn, suspended from an upper framework 30 and a lower framework 46 as by piston 36 and cylinder 38. The lower ends of bolts 19 are threaded into holes tapped into the various sections of the male mold. Bolts 19 pass through holes drilled or pre-formed in supporting carriage 18, the bolts being free to move up and down therein.

During its descent along with the male mold 20, the rectangular pressure ring 15 is initially supported by support carriage 18 and later by the framework 46. This is clearly seen in FIGS. 1 and 2. As there shown, the lower ends of the four rods 21 are threaded into holes tapped into the four corners of the rectangular pressure ring 15. The four rods 21 pass freely through holes provided in support carriage 18 and in a cross member of framework 46, and are provided at their threaded upper ends with adjustable stop nuts 32. (Rods 21 project above upper framework 30 but do not pass through any member thereof, as seen in the broken away section.) Adjustably positioned on the rods 21, above the support carriage 18, are collars 34 provided with set screws 35. Collars 34 are so positioned that, when the male mold is in the uppermost position, pressure ring 15 is initially supported by the collars 34 resting on the upper surface of support carriage 18. However, as the piston 36 and support carriage 18 move downward, the stop nuts 32 engage the upper surface of framework 46, thus preventing further downward movement of rods 21 and pressure ring 15. Thereafter, as carriage 18 and the multi-section male mold continue their downward movement, the pressure ring 15 remains suspended at a fixed distance above the ledge 62 of the lower mold 10. As previously indicated, this distance is preferably about one-half the over-all thickness of the carpet being molded. This distance has been found to so confine the carpet between the pressure ring 15 and the lower mold 10 as not to permit wrinkles to be formed in the carpet in the confined space, and this has been found to prevent wrinkles from being formed in the carpet anywhere within the mold.

It will be seen from what has been said above, that collars 34 on rods 21, by controlling the vertical position of pressure ring 15 relative to that of the various sections of the multi-section male mold, control the time of contact of pressure ring 15 with the carpet relative to that of the sections of the male mold. The stop nuts 32, on the other hand, by controlling the lower limit of the pressure ring 15, control the vertical dimension of the narrow space around the periphery of the mold used to confine the carpet and prevent wrinkles.

The four rods 21 also serve as guides to maintain the alignment of all of the male mold.

While any suitable means may be employed to effect the up and down movement of the male mold, we have selected for illustration in the drawing an air pressure system which includes the pneumatic cylinder 38 supported by upper frame 30 and also by a next lower frame 46 and having movable therein the piston 36 under the positive control of a manually operable three-way air valve 40. The up and down movements of the carriage 18 (which supports the multi-section male mold 20 and also at times the pressure ring 15) are guided by rods 42 threaded into the upper surface of carriage 18 and freely slidable in guide tubes 44 secured to the upper framework 30 of the main frame.

As indicated previously above, FIGS. 3–7 comprise a set of sequential views which illustrate the successive positions of the male mold as it descends upon and into the female mold.

Referring first to FIG. 3, a heated carpet 50, which may be a tufted, woven, knitted or other carpet, having on the underside thereof a polyethylene or other thermoplastic backing 52 is placed across the female mold 10 without draping the carpet into the wells of the mold. If a jute pad underlay is to be used, a jute pad 70 die cut to desired shape and size is preferably placed in female mold 10, as shown in FIG. 3 and the heated carpet with the hot polyethylene backing is stretched across the top of mold 10 without depressing the carpet into the wells of the mold. Alternatively, the jute pad may be stretched across the top of female mold 10 without depressing the pad thereinto and the carpet stretched across the female mold on top of the jute pad. The use of a jute pad underlay is not, however, an essential part of the present invention.

In the illustrated embodiment, as seen more clearly in FIG. 9, female mold 10 is characterized by a raised or humped center portion 54, a pair of wells 56, one on each side of the raised center portion, and raised edge portions 62, the contour of the illustrated female mold conforming to that of the rear floor of a modern automobile. In practice, the size and shape of the mold 10 will vary in accordance with the floor dimensions of the particular automobile into which the molded carpet is to be placed.

Poised above the female mold 10 in FIG. 3 is the multi-section male mold 20, the center section 12 of which projects below the intermediate sections 13L and 13R located on either side thereof. Intermediate sections 13L and 13R in turn project below the end sections 14L and 14R of the male mold.

The center section 12 of the male mold has a concave arch-like undersurface adapted to mate with the raised or humped center portion 54 of the female mold, thereby to form the carpet to fit over the hump or tunnel which characterizes the rear floor of many present day automobiles. Intermediate sections 13L and 13R of the male mold are adapted to mate with the wells 56 of the female mold, while end sections 14L and 13R of the male mold are adapted to mate with the outer portions of the female mold including outer parts of the well floor and the well walls 63. Accordingly, end sections 14L and 14R of the male mold have outer edges which incline downwardly inwardly to mate with the upwardly outwardly sloping walls 63 of the wells 56.

In FIG. 4, the carriage 18 carrying the multi-section male mold 20 and pressure ring 15 has been lowered by the piston 36, and the projections of the center section 12 have now made contact with the carpet 50. The pressure ring 15 has just made contact with the carpet but before this contact was made carpet 50 was drawn in to the center from the outer regions, the carpet moving in the directions shown by the arrows A.

In FIG. 5, the carriage 18 has been further lowered and the center section 12 of the male mold has mated more fully with the hump 54 of the female mold. Pressure ring 15 is now in restricted contact with the carpet 50, the full weight of ring 15 being on the upper half of the carpet. For, after the downward movement of carriage 18 permitted pressure ring 15 to lower itself to the limit allowed by the adjustable stop nuts 32, further downward movement of carriage 18 lowered the carriage 18 below the now fixed positions of collars 34. Thus, collars 34 of rods 21 moved upwardly relative to carriage 18, and this permitted the weight of ring 15 to rest on the upper half of the carpet 50, thus holding the carpet flat against ledge 62 of the female mold 10 and thereby so confining the carpet between the pressure ring 15 and ledge 62 that wrinkles cannot be formed in the carpet.

Referring again to FIG. 5, the intermediate sections 13L and 13R of the male mold are about to make contact with the carpet but have not yet done so.

FIG. 6 shows the carriage 18 in still lower position with intermediate sections 13L and 13R of the male mold pressing carpet 50 onto the floor of the wells 56 of the female mold. The full weight of center section 12 is now on the center hump 54 of the female mold 10, as is seen by the fact that the upper ends of the rods 19 in the center section 12 have risen above carriage 18. Pressure ring 15 continues to apply the selected degree of confinement to the outer portions of the carpet 50. End sections 14L and 14R have not yet made contact with the carpet but are about to do so.

In FIG. 7, the carriage 18 has been lowered still further and all sections of the male mold 20 are now fully mated with corresponding portions of the female mold 10. The weights of all sections of the male mold are now resting on carpet 50 as is indicated by the fact that the upper ends of all of the rods 19 are now raised above the carriage 18. As a result, the carpet 50 is now fully pressed into its intended final molded form. In reaching this final form, carpet 50 was further drawn in from the ledges 62 as end sections 14L and 14R of the male mold dropped into place. During this movement of the carpet, the confining action of pressure ring 15 continued, and by keeping the carpet confined in the narrow space which separates the ring 15 from the ledge 62, prevents wrinkling of the carpet.

Incidentally, no effort has been made in FIGS. 4–7 to show the jute pad 70 which appears in FIG. 3 in the lower mold 10, since the use of a jute pad, as indicated previously, is optional.

In operation, in one practical embodiment in which no jute underlay is employed, a tufted, woven, knitted, or other carpet, with its back coated with polyethylene, is cut to length and placed in an oven (not shown) which is heated by infra red lamps to a temperature of the order of 400° F. The polyethylene becomes molten, and while still in this state, the carpet with the hot molten polyethylene backing is placed, face up, across the female mold 10. The 3-way air valve 40 is then operated to cause the carriage 18 to lower the male mold sections into mating engagement with the female mold 10. In the particular practical embodiment referred to, carriage 18 is lowered at a rate of approximately 25 feet per minute. The center section 12 contacts the carpet first and begins to form the tunnel part. The carpet is carried down and when it reaches 1 7/16" of the bottom of the wells 56, pressure ring 15 comes to rest about halfway between the upper and lower surfaces of the carpet, which in a typical case may be 1/4" thick. This position, which is explained above, is determined by the adjustment of nuts 32 of rods 21, allows the carpet thereafter to be drawn free of wrinkles into the wells 56 as the center, intermediate and end sections of the male mold descend successively into final mating positions.

The relative positions vertically of the various sections of the male mold are adjustably controlled by the nuts 65. As indicated previously, adjustment of pressure ring 15 relative to the male mold sections for the purpose of controlling the time at which "hold down" occurs, is made by means of the collars 34 and set screws 35.

While the preferred embodiment of our invention has been described in some detail, it will be obvious to one skilled in the art that various modifications may be made without departing from the invention as hereinafter claimed. For example, while we have illustrated and described specifically a five-section male mold, the male mold may comprise either less or more than five sections.

Having thus described our invention, we claim:

1. Apparatus for molding fabric material, said apparatus comprising: a lower mold; an upper mold; a movable carriage; means for suspending said upper mold from said carriage; a fixed upper frame; means for movably suspending said carriage from said upper frame; means for moving said carriage vertically; a peripheral pressure ring; means for supporting said pressure ring from said moving carriage during the first portion of its downward movement; and means for supporting said pressure ring, during the last portion of said downward movement of said carriage, from said fixed upper frame in a fixed lower-limit position at a spaced distance above said lower mold substantially less than the uncompressed thickness of the fabric material to be molded, for forming beneath said pressure ring a through passage of vertical confinement through which the fabric is drawn into the forming region during the molding operation.

2. Apparatus for molding fabric material, said apparatus comprising: a lower mold; an upper mold; a movable carriage; means for retractably suspending said upper mold from said carriage; a fixed upper frame; means for movably suspending said carriage from said upper frame; power means for moving said carriage vertically; a peripheral pressure ring; means for supporting said pressure ring from said moving carriage during the first portion of its downward movement; and adjustable means for supporting said pressure ring, during the last portion of said downward movement of said carriage, from said fixed upper frame in a fixed lower-limit position at a spaced distance above said lower mold substantially less than the uncompressed thickness of the fabric material to be molded, for forming beneath said pressure ring a through peripheral passage of vertical confinement through which the fabric is drawn into the forming region during the molding operation.

3. Apparatus for molding fabric material, said apparatus comprising: a lower mold; an upper mold; a movable carriage; means for suspending said upper mold from said carriage; a fixed upper frame; means for suspending said carriage from said upper frame and for moving said carriage vertically relative to said frame; a peripheral pressure ring; and means for supporting said pressure ring from said moving carriage during the first portion only of its downward movement and for transferring support for said pressure ring, during the last portion of said downward movement of said carriage, to said fixed upper frame for holding said pressure ring in a fixed lower-limit position at a spaced distance above said lower mold for providing beneath said pressure ring a peripheral confining through passageway having a vertical dimension substantially less than the uncompressed thickness of the fabric material to be molded.

4. Apparatus as claimed in claim 3 characterized in that said upper mold is the male mold, and further characterized in that said male mold comprises a plurality of sections including a center section which, when said upper mold is in raised position, projects downward below the sections on either side thereof.

References Cited in the file of this patent

UNITED STATES PATENTS

| | | |
|---|---|---|
| 368,526 | Fowler | Aug. 16, 1887 |
| 1,424,671 | Ogden et al. | Aug. 1, 1922 |
| 1,667,673 | Peirson et al. | Apr. 24, 1928 |
| 1,668,349 | Baum | May 1, 1928 |
| 2,270,187 | Dulmage | Jan. 13, 1942 |
| 2,531,539 | Smith | Nov. 28, 1950 |
| 2,939,179 | Penman et al. | June 7, 1960 |
| 2,986,777 | Carter | June 6, 1961 |
| 2,991,212 | Cotterman et al. | July 4, 1961 |

FOREIGN PATENTS

| | | |
|---|---|---|
| 562,789 | Belgium | Dec. 14, 1957 |